(12) United States Patent
Storch

(10) Patent No.: US 8,177,054 B2
(45) Date of Patent: *May 15, 2012

(54) METHOD OF CONVEYING MATERIAL

(75) Inventor: Thomas Storch, Göttlesbrunn (AT)

(73) Assignee: FLSmidth A/S, Valby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/034,566

(22) Filed: Feb. 24, 2011

(65) Prior Publication Data

US 2011/0139585 A1 Jun. 16, 2011

Related U.S. Application Data

(63) Continuation of application No. 12/083,414, filed as application No. PCT/EP2005/011117 on Oct. 15, 2005, now Pat. No. 7,913,836.

(51) Int. Cl.
*B65G 15/60* (2006.01)
(52) U.S. Cl. ........................ 198/819; 198/839
(58) Field of Classification Search .................. 198/819, 198/839, 842
See application file for complete search history.

(56) References Cited

U.S. PATENT DOCUMENTS

| 4,402,395 | A | 9/1983 | Hashimoto |
| 5,027,943 | A | 7/1991 | Tingskog |
| 5,161,675 | A | 11/1992 | Engst et al. |
| 5,682,974 | A | 11/1997 | Van Der Kooy |
| 5,941,368 | A | 8/1999 | Horak |
| 6,021,889 | A | 2/2000 | Tingskog |
| 6,357,572 | B2 * | 3/2002 | Kubota ..................... 198/321 |
| 6,640,965 | B2 | 11/2003 | Trieb |
| 6,919,557 | B2 * | 7/2005 | Mergy et al. ............ 250/223 R |
| 7,036,654 | B2 | 5/2006 | Frost |
| 7,726,468 | B2 | 6/2010 | Brunone |
| 2005/0247547 | A1 * | 11/2005 | Frost ........................... 198/839 |
| 2007/0074955 | A1 | 4/2007 | Switzeny |
| 2008/0283368 | A1 | 11/2008 | Brewka et al. |

FOREIGN PATENT DOCUMENTS

JP 03223009 10/1991

* cited by examiner

*Primary Examiner* — Mark A Deuble
(74) *Attorney, Agent, or Firm* — Lucas & Mercanti, LLP; Klaus P. Stoffel

(57) ABSTRACT

A method for conveying material wherein a conveyor belt is guided over head drums so as to form a forward travelling and returning stretch. The conveyor belt is guided in such a way that the forward travelling and returning stretches intersect each other as seen in the horizontal projection, i.e., as seen in the direction of the drum axes, and the conveyor belt travels over both head drums from the top toward the bottom.

6 Claims, 1 Drawing Sheet

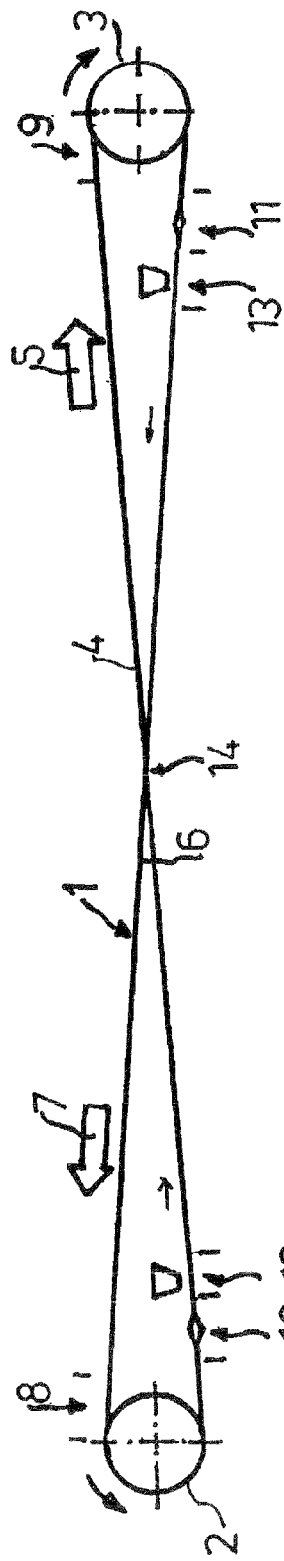
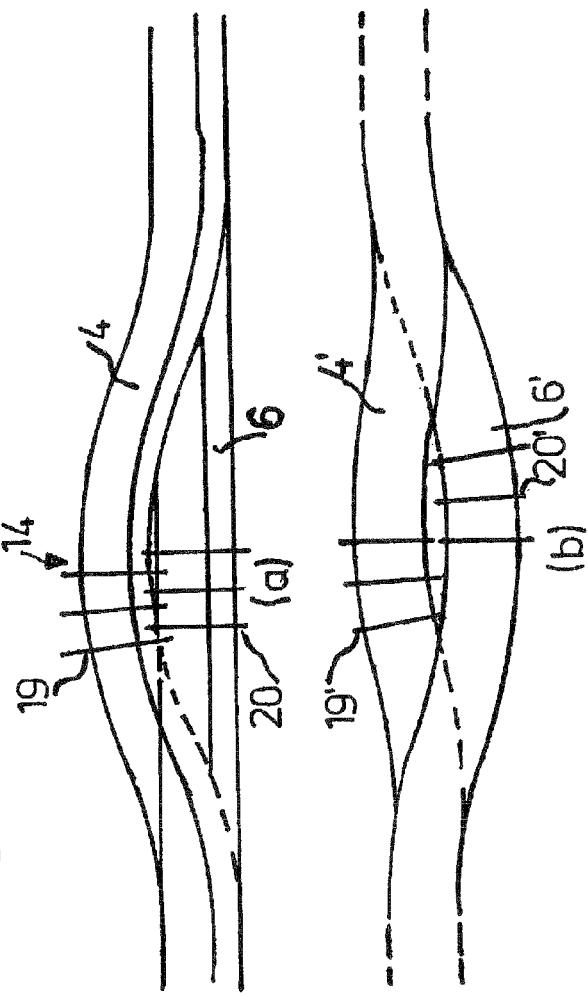
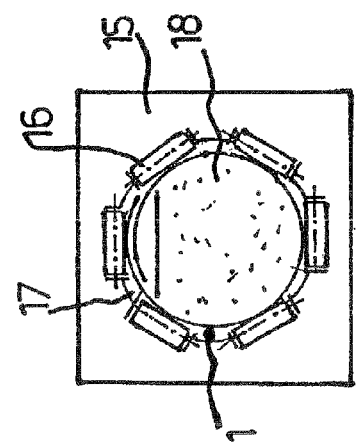
Fig. 1
Fig. 2
Fig. 3

US 8,177,054 B2

METHOD OF CONVEYING MATERIAL

REFERENCE TO RELATED APPLICATIONS

This application is a continuation of U.S. Patent Application 12/083,414 filed Apr. 13, 2009, which is a 371 of International application PCT/EP2005/01117 filed Oct. 15, 2005, the content of each of which is hereby incorporated by reference.

BACKGROUND OF INVENTION

The present invention relates to a conveyor, particularly tubular conveyor, with a conveyor belt guided over head drums so as to form a forward stretch and a returning stretch, and with guides for the stretches arranged between the head drums.

Conveyors are known because of use in which, in addition to the forward traveling stretch, also the returning lower stretch forms a conveying path, so that different materials can be transported in opposite directions. While the material being transported on the upper stretch can be unloaded at the head drum remote from the loading location, unloading of the lower stretch requires a separate unloading station in which the material is moved in a loop for throwing off the material and the stretch is possibly subsequently cleaned in order to avoid contamination of the head drums by the material being conveyed.

SUMMARY OF THE INVENTION

The present invention is based on the object of providing a novel conveyor of the above-mentioned type which is suitable for conveying on two conveying paths and which requires lower structural and operational expenditures as compared to conventional conveyors.

The conveyor according to the invention which solves this object is characterized in that the two stretch guides intersect each other in the horizontal projection and the conveyor belt travels over both head drums from the top toward the bottom.

The forward traveling stretch as well as the returning stretch can advantageously be unloaded at the respective head drum. A separate throwing loop is not necessary. The structural expenditures which are required in order to guide the stretch guides which intersect each other in the horizontal projection and for guiding the stretches at the point of intersection past each other is significantly lower than the structural expenditures for such a throwing loop.

In accordance with an especially preferred embodiment of the invention, the conveyor belt travels in the lower sections of the forward traveling stretch and the returning stretch through a belt turning station which is arranged in front of a loading station. In this manner, it is ensured that for the return transport the same belt side is used for receiving the material as in the forward transport. Contaminations of the guides and the head drums by the material being conveyed are avoided.

In order to ensure the necessary horizontal offset of the guides or stretches at the point of intersection, at least one of the two guides is curved. It is understood that the curvature can be kept very low if the two guides and stretches give way to each other.

In the following, the invention will be explained in more detail with the aid of embodiments and the enclosed drawings which refer to these embodiments.

BRIEF DESCRIPTION OF THE DRAWING

In the drawing:
FIG. 1 is a schematic illustration of a tubular conveyor according to the invention,
FIG. 2 is a cross-sectional view of a conveying stretch of the tubular conveyor of FIG. 1, and
FIG. 3 is a top view of possible arrangements of stretch guides usable in the conveyor of FIG. 1.

DETAILED DESCRIPTION OF THE INVENTION

A tubular conveyor illustrated in a schematic side view in FIG. 1 includes an endless conveyor belt 1 which travels over head drums 2 and 3 and is driven by these drums.

The conveyor belt 1 forms a stretch 4 which, as indicated by arrow 5, moves in the direction from the bottom side of the head drum 2 to the upper side of the head drum 3, as well as a stretch 6 which, as indicated by arrow 7, travels in the opposite direction from the bottom side of the head drum 3 to the upper side of the head drum 2. The stretches 4 and 6 form two conveying paths for different bulk materials.

FIG. 2 shows the conveyor belt 1 for transporting the bulk material 18 which is formed into a tubular by guides in the stretches 4 and 6. Stretch guides are formed by arranging a row of holding frames 15 at which support rollers 16 are mounted distributed around an opening 17.

Belt opening stretches 8 and 9 are arranged at the drums 2 and 3 for converting the conveyor belt 1 formed into a tubular into a belt shape suitable for changing the head drum.

A belt turning station 10 or 11, respectively, is provided in the respectively lower portions of the stretches 4 and 6. In the turning stretches, the conveyor belt is turned by means of a roller arrangement, not shown, by 180 degree. The belt turning stretches 10 and 11 are followed in the conveying direction by a loading and tubular forming path 12, 13 each.

As can be seen in FIG. 1, the stretch 4 and the stretch 6 intersect at 14, as seen in the direction of the head drum axes.

In accordance with FIG. 3a, the stretch 4 can be guided by a guide indicated at 19 at the point of intersection 14 along a curved path past the stretch 6 or its guide 20. In accordance with FIG. 3b, both stretches 4 and 6 can also be guided past each other along curves by appropriate guides 19' and 20'.

Any bulk material loaded at the loading and tubular forming stretch 12 onto the stretch 6 is unloaded at the head drum 3, wherein the material drops from the conveyor belt 1 which is opened at 9. The conveyor belt is then turned by 180 degree. in the belt turning station 11 and can once again be loaded with bulk material of a different type in the loading and tubular forming stretch 13.

Loading advantageously takes place at the lower section of the stretch which is easily accessible. By turning the belt, it is not necessary to clean the belt, unless bulk material residues of the bulk material being transported on the stretch 4 are not to be mixed in with material being transported on the stretch 6.

I claim:
1. A method of conveying material comprising the steps of:
installing a first head drum, said first head drum having a bottom side and an upper side, and a second head drum, said second head drum having a bottom side and an upper side;
guiding a conveyor belt having a forward travelling stretch moving from the bottom side of said first head drum to the upper side of said second head drum and having a return travelling stretch moving from the bottom side of said second head drum to the upper side of said first head drum;

loading a first bulk material onto said conveyor belt at a lower section of said forward travelling stretch;

unloading said first bulk material from said conveyor belt at the upper side of said second head drum.

2. The method of claim 1 wherein the forward travelling stretch and the return travelling stretch, which in a horizontal projection intersect each other, are guided to pass one another where said stretches intersect.

3. The method of claim 1 wherein the lower section of the forward travelling stretch and a lower section of the return travelling stretch, respectively, travel through a belt turning stretch prior being loaded with a bulk material.

4. The method of claim 1 with the additional steps of:

loading a second bulk material onto said conveyor belt at the lower section of said return travelling stretch;

unloading said second bulk material from said conveyor belt at the upper side of said first head drum.

5. A conveyor comprising:

a tubular conveyor belt having a forward travelling stretch and a return travelling stretch;

a first head drum having a bottom side and an upper side;

a second head drum having a bottom side and an upper side;

a plurality of guides to guide said conveyor belt from said first head drum to said second head drum where the forward travelling stretch moves from the bottom side of said first head drum to the upper side of said second head drum and the return travelling stretch moves in an opposite direction, from the bottom side of said second head drum to the upper side of said first head drum.

6. The conveyor of claim 5 wherein a guide is positioned where said stretches intersect ensuring that said stretches are guided past one another at said intersection.

* * * * *